United States Patent [19]

Hoy

[11] 4,358,139

[45] Nov. 9, 1982

[54] COUPLING FOR MINE VENTILATION CONDUITS

[75] Inventor: Robert W. Hoy, Warsaw, Ind.

[73] Assignee: Peabody ABC Corporation, Warsaw, Ind.

[21] Appl. No.: 212,793

[22] Filed: Dec. 3, 1980

[51] Int. Cl.³ .............................................. F16L 21/02
[52] U.S. Cl. .................... 285/332.3; 24/269; 156/173; 285/420; 285/423
[58] Field of Search ............... 285/332.2, 332.3, 260, 285/423, 374, 420; 24/269, 71.2, 71.3, 301, 300; 156/173

[56] References Cited

U.S. PATENT DOCUMENTS

| 327,126 | 9/1885 | Walker . | |
|---|---|---|---|
| 603,366 | 5/1898 | Riehl, Jr. | 285/332.2 X |
| 724,390 | 3/1903 | Hirschell | 285/332.3 X |
| 937,437 | 10/1909 | Halstead et al. | 285/332.2 X |
| 1,787,865 | 1/1931 | Humphrey . | |
| 1,963,436 | 6/1934 | Dumke | 24/269 |
| 2,196,622 | 4/1940 | Bean | 285/332.3 |
| 2,354,833 | 8/1944 | Roberts | 24/269 |
| 3,038,469 | 6/1962 | Jacuzzi | 285/305 X |
| 3,884,450 | 5/1975 | Brammer | 24/269 X |
| 3,953,060 | 4/1976 | Eross | 285/305 X |
| 3,962,759 | 6/1976 | Nagai | 24/269 |
| 4,101,149 | 7/1978 | Fleischer et al. | 285/332.2 X |

FOREIGN PATENT DOCUMENTS

| 1460556 | 10/1966 | France | 285/260 |
|---|---|---|---|
| 603933 | 6/1948 | United Kingdom | 285/261 |

Primary Examiner—Thomas F. Callaghan
Attorney, Agent, or Firm—St. Onge, Steward, Johnston & Reens

[57] ABSTRACT

A coupling for mine ventilation conduits comprising a first tubular conduit having a flared end portion for receiving an end portion of a second tubular conduit, at least one of the conduits having an elongate flexible strap attached thereto having a length sufficient to reach the other tubular conduit. A resilient compressible strip is placed between said first and second tubular conduits around the periphery of the end position of the second tubular conduit. The coupling also includes a device for tightening the flexible strap length and for holding the strap in a tightened position, the device being secured to one of said conduits and providing for tightening of said strap to draw said tubular conduits together to compress the resilient strip between the flared end portion of the first conduit and the end portion of the second conduit to thereby provide a substantially air tight seal between said conduits.

5 Claims, 6 Drawing Figures

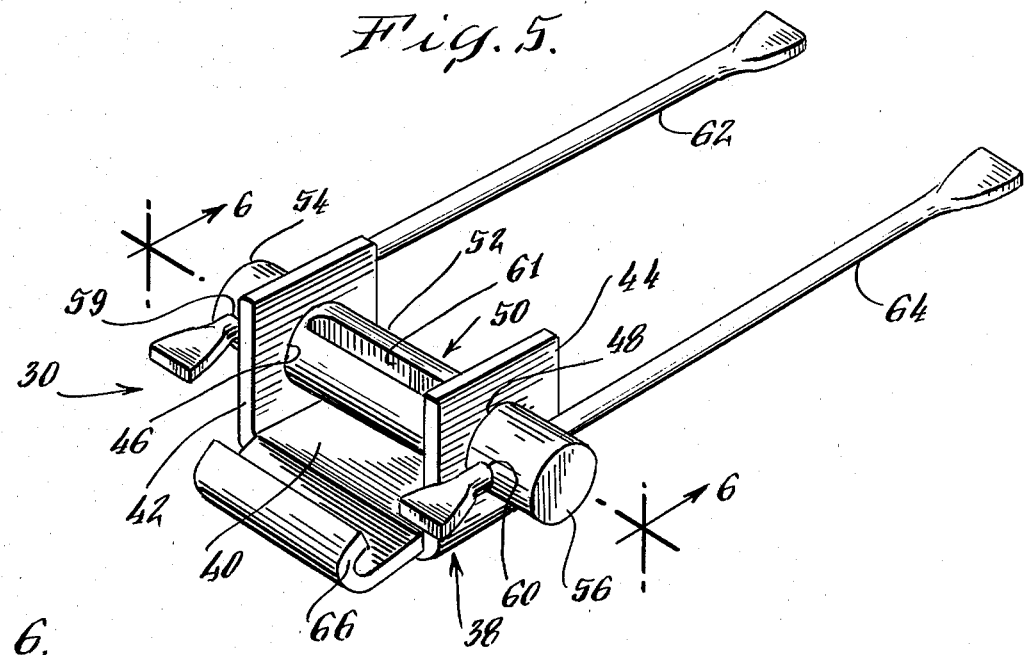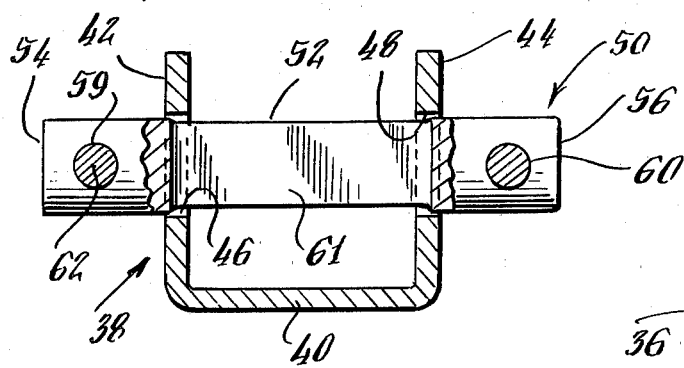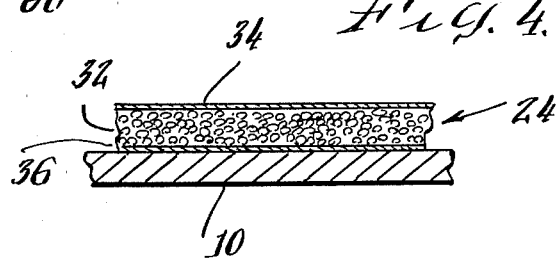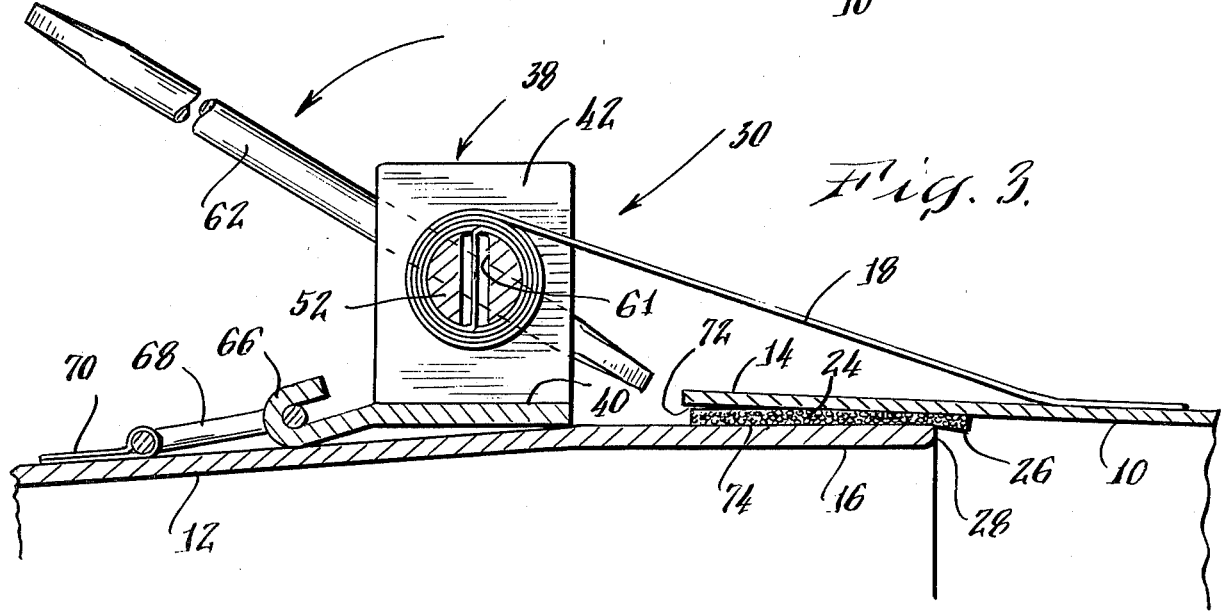

COUPLING FOR MINE VENTILATION CONDUITS

BACKGROUND OF THE INVENTION

1. Field of the Invention

The present invention relates to couplings for mine ventilation conduits, and, more particularly, the present invention relates to a coupling for mine ventilation conduits that provides a substantially air tight joint between the conduits.

2. Description of the Prior Art

It has long been recognized that it is desirable to provide a substantially air tight coupling between tubular conduits used for mine ventilation. One type of prior art substantially air tight coupling comprises a steel tubular conduit having a flanged end. This type of coupling requires a gasket positioned between the flanges and bolts for holding the flanges in position. This type of coupling is cumbersome to install, is expensive, requires precise alignment between the conduits, and comprises many pieces including a gasket and bolts which may be misplaced.

A coupling of fiberglass reinforced plastic conduits for mine ventilation is also known. This coupling comprises a tubular conduit having a flared end portion which mates with the end portion of a second tubular conduit. The end portion of the second conduit is force fitted into the flared end portion of the first conduit. Although this coupling is less expensive and easier to install than the steel tubular type coupling discussed above, this coupling results in substantial air leakage due, at least in part, to irregularities in the conduit and the tendency of the coupled conduits to separate.

SUMMARY OF THE INVENTION

The present invention provides a coupling for mine ventilation conduits which provides a substantially air tight seal between conduits. A coupling in accordance with the present invention includes a first tubular conduit having a flared end portion for receiving an end portion of a second tubular conduit. An elongate flexible strap is attached to one of the tubular conduits and has a length sufficient to reach the other tubular conduit when the conduits are mated. A resilient compressible strip, preferrably made of a foam material, is placed between the end portions of the two conduits around the periphery of the second conduit. The coupling further includes a device for tightening the flexible strap length and for holding the tightened strap in position, the device being secured to one of the tubular conduits. This tightening device provides for tightening of the strap to draw the tubular conduits together to compress the resilient strip between the flared end portion of the first conduit and the end portion of the second conduit to thereby provide a substantially air tight seal between the conduits.

A coupling in accordance with the present invention provides not only a substantially air tight seal, but also, provides an inexpensive, easy to install coupling that is less prone to failure because of misalignment of the conduits. These advantages and others will be apparent from the following detailed description of the invention with reference to the drawings.

BRIEF DESCRIPTION OF THE DRAWINGS

FIG. 3 is an enlarged sectional view of the coupling and the device for tightening and holding the strap;

FIG. 4 is an enlarged sectional view of the resilient foam material adhered to the tubular conduit;

FIG. 5 is a perspective view of the device for tightening and holding the strap shown in FIG. 3;

FIG. 6 is a sectional view of the strap tightening device along the plane 6—6 of FIG. 5.

DESCRIPTION OF THE PREFERRED EMBODIMENT

Figure 1:
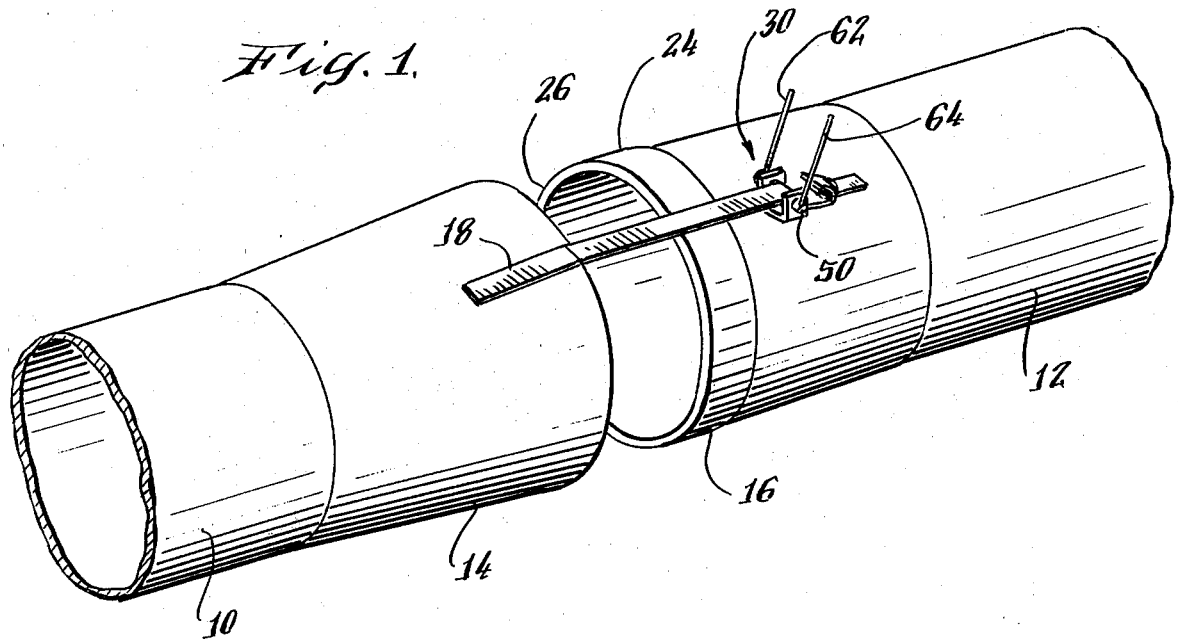
FIG. 1 is a perspective view of a coupling for mine ventilation conduits prior to assembly of the coupling.
Figure 2:
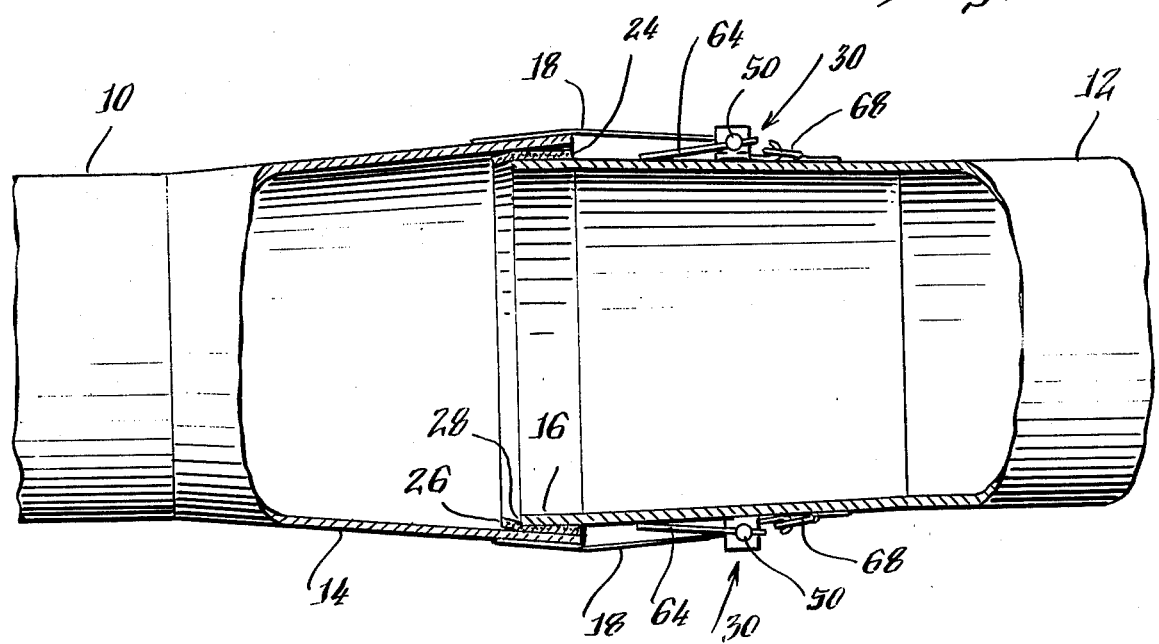
FIG. 2 is a sectional view of the coupling shown in FIG. 1 after it has been assembled.

Referring to FIGS. 1, 2 and 3, a coupling for joining a first tubular conduit 10 and a second tubular conduit 12 is shown. Conduits 10 and 12 have a generally cylindrical shape and are made from fiberglass reinforced plastic which is preferably filament wound. Cylindrical conduits are shown by way of example and conduits having other shapes such as oval may be used. The conduits may also be made of various materials and may be unreinforced or reinforced by methods other than filament winding. Tubular conduit 10 includes a flared or diverging end portion 14 for receiving the end portion 16 of tubular conduit 12.

An elongate flexible strap 18 is attached at one end thereof to either tubular conduit 10 or tubular conduit 12. In the case of the coupling shown in FIGS. 1–3, a strap 18 is anchored to conduit 10 and is preferably attached to conduit 10 during fabrication.

A resilient compressible strap, preferably of foamed plastic, is adhered around the periphery of the end portion 16 of tubular conduit 12. The resilient strip 24 has a small portion 26 extending beyond the lip 28 of conduit 12 so that when conduit 12 is inserted into the diverging portion 14 of conduit 10, the overlapping portion 26 of resilient strip 24 is free to wrap around end lip 28 of conduit 12.

The device 30 for tightening and holding the strap is attached to tubular conduit 12 and tightens flexible strap 18 to draw tubular conduits 10 and 12 together. The detail of the structure and operation of tightening device 30 will be described in detail below. As the device 30 tightens strap 18, end portion 16 of conduit 12 is drawn within flared end portion 14 of conduit 10. As conduits 10 and 12 are moved together, resilient strip 24 is compressed between inner surface 72 of flared end portion 14 and the outer surface 74 of end portion 16 of conduit 12 to provide a substantially air tight seal between conduits 10 and 12. As shown in FIG. 3, the resilient strip 24 is compressed in the region of end lip 28 of conduit 12. By using a resilient compressible material, and irregularities which exist in surfaces 72 and 74 of conduits 10 and 12 are accommodated. The tightening device 30 also holds the tightening strap in position to maintain the seal.

The resilient foam material of strip 24 and the manner by which the foam material is adhered to conduit 10 will be described with respect to FIG. 4. The resilient foam material 24 has a body 32 which is preferably polyvinyl chloride foam although other types of foam such as polyurethanes, polyesters and polyethers may be used. Body 32 is faced at one side thereof with a thin film 34 which is preferably a polyester film such as Mylar. Film 34 may be made of various materials other than polyester such as polyvinyl chloride, polyethylene and aluminum foil. Film 34 provides integrity to foam 32 and increases the useful life of foam body 32 which would otherwise be worn after repeated insertions of tubular conduit 12 into the flared end portion 14 of tubular conduit 10. Foam body 32 is preferably adhered to the periphery of conduit 10 by a conventional adhesive 36. The foam material including the body portion 32, the film 34 and the adhesive 36 may be formed as a single unit. It is preferred that the foam material 24 be adhered to the exterior surface 74 of conduit 12, although, alternatively, the foam material 24 could be adhered to the inner surface 72 of the flared portion 14 of conduit 10.

Referring to FIGS. 3, 5 and 6, the strap tightening device used in coupling in accordance with the present invention will now be described in detail. It should be understood that this device is being shown as a preferred embodiment and that other mechanisms for tightening and holding the tightened strap in position may be used. Tightening device 30 includes a body 38 comprising a floor 40 and two walls 42 and 44 extending upwardly from the floor. Walls 42 and 44 include apertures 46 and 48 for receiving a spool rotatable with respect to walls 42 and 44. Spool 50 has a central portion 52 extending between walls 42 and 44 and extending upwardly from the floor. Walls 42 and 44 include apertures 46 and 48 for receiving a spool rotatable with respect to walls 42 and 44. Spool 50 has a central portion 52 extending between walls 42 and 44 and end portions 54 and 56 extending through the apertures 46 and 48. The central portion 52 of spool 50 includes an elongated slot 61 which extends through spool 50. Strap 18 may be threaded through slot 61 which retains the strap (see FIG. 3).

End portions 54 and 56 of spool 50 include holes 59 and 60 which extend transversely to the longitudinal access of spool 50 and which receive elongate lever arms 62 and 64 which are slidable with respect to spool 50 in holes 58 and 60. A hook 66, extends from one side of floor 40 and provides for releasable attachment of buckle 30 to a ring 68 attached to conduit 12 by a strap 70.

The operation of the strap tightening device will now be described with respect to FIGS. 1, 2, 3 and 5. As shown in FIG. 1, the conduits 10 and 12 are in a position just prior to joining thereof. The conduits 10 and 12 are then moved into mating relation, that is, end portion 16 of conduit 12 is inserted into flared end portion 14 of conduit 10. The end 60 of strap 18 is threaded through slot 61 of tightening device 30. As shown in FIGS. 1 and 3, lever arms 62 and 64 are grasped and rotated to tighten strap 18 to the position shown in FIG. 3 (several turns have occurred on spool 50). As conduit 12 moves within the flared portion 14 of conduit 10, the resilient compressible foam strip 24 contacts the interior surface of the flared portion 14 and is compressed to provide a seal between the two conduits as shown in FIG. 3.

When the strap has been tightened, both levers 62 and 64 are slid in holes 59 and 60 to a position to maintain strap 18 in a tightened condition. Referring to FIG. 2, lever 64, under the urging of the tensional force on strap 18 transmitted to spool 50, urges the lever arm 64 (and also lever arm 62 not shown in FIG. 2) in a counterclockwise direction to lock the lever arm against conduit 12.

Only one strap and tightening device set is shown in FIG. 1. It is preferable to have at least two sets of straps and tightening devices to provide for balanced application of forces on the coupling. As shown in FIG. 2, a second set of tightening devices and straps is provided and since this set is identical to the set described above, the same reference characters are used in the drawings.

Strap 18 is preferably a flexible flat nylon strap. It should be understood that materials other than nylon may be used and belts, cords, ropes and other means for drawing the conduits together may be used.

It should be understood that although specific embodiments of the invention have been described herein in detail, such description is for purposes of illustration only and modifications may be made thereto by those skilled in the art within the scope of the invention.

What is claimed is:

1. A coupling for ventilation conduits comprising:
   a first tubular ventilation conduit having a flared end portion for receiving an end portion of a second tubular ventilation conduit;
   an elongate flexible strap attached to one of said tubular conduits and having a length sufficient to reach said other tubular conduit;
   a resilient compressible member positioned between the end portions of said conduits; and
   means for tightening said flexible strap length and for holding said tightened strap length, said means for tightening and holding being secured to said other tubular conduit and providing for tightening of said strap to draw said tubular conduits together to compress said resilient member between said flared end portion of said first conduit and said end portion of said second conduit to thereby provide a substantially air tight seal between said conduits, said means for tightening and holding comprises a body having two walls extending upwardly from a floor, each of said walls including an aperture for receiving a rotatable spool for winding said strap, said spool having a central portion extending between said walls including means for retaining said strap, said spool including ends extending through said apertures, at least one of said ends including a hole extending transversely to the longitudinal axis of the spool, said hole receiving an elongate lever arm slidable within said hole to provide for rotation of said spool, said elongate lever arm moveable to an engaged position with one of said conduits prevent unwinding of said strap, said means for tightening and holding including a hook extending from one side of the body, said other tubular conduit having a strap attached thereto, said strap having a ring attached at the end thereof for releasable engagement with said hook to provide for releasable securement of said means for tightening and holding to said other conduit.

2. A coupling according to claim 1 wherein said resilient compressible member comprises a strip is adhered around the periphery of said end portion of said second tubular conduit.

3. A coupling according to claim 1 wherein said resilient compressible member is faced with a plastic film on one side thereof and is adhered to the periphery of the second tubular conduit on the other side thereof.

4. A coupling according to claim 3 wherein said means for tightening and holding includes two lever arms.

5. A coupling according to claim 1 wherein said tubular conduits are formed of fiberglass reinforced plastic.

* * * * *